United States Patent [19]

Terae et al.

[11] Patent Number: 5,028,679

[45] Date of Patent: Jul. 2, 1991

[54] METHOD FOR PREPARING PERFLUOROALKYL GROUP-CONTAINING ORGANOPOLYSILOXANES

[75] Inventors: Nobuyuki Terae; Teiichi Mutoh; Masaki Tanaka, all of Annaka, Japan

[73] Assignee: Shin-Etsu Chemical Co., Ltd., Tokyo, Japan

[21] Appl. No.: 415,595

[22] Filed: Oct. 2, 1989

[30] Foreign Application Priority Data

Oct. 5, 1988 [JP] Japan ................. 63-249729

[51] Int. Cl.$^5$ ............................................. C08G 77/06
[52] U.S. Cl. ........................................ 528/12; 528/23; 528/37; 528/42; 556/450; 556/454; 556/485
[58] Field of Search ............... 528/37, 42, 12, 23; 556/450, 454, 485

[56] References Cited

U.S. PATENT DOCUMENTS 4,157,337 6/1979 Evans .................................. 528/42
4,814,418 3/1989 Miyake et al. ................... 528/42

Primary Examiner—Melvyn I. Marquis
Attorney, Agent, or Firm—Birch, Stewart, Kolasch & Birch

[57] ABSTRACT

Perfluoroalkyl group containing organopolysiloxanes having a high degree of polymerization can be prepared by reacting a liquid organopolysiloxane of formula (I): $R^1_a R^2_b (OH)_c SiO_{[4-(a+b+c)]/2}$ with an alkali metal hydroxide to form an alkali metal silanolate; reacting the alkali metal silanolate with a perfluoroalkyl group-containing organosilane of formula (II): $RfR^3SiX_2$ to synthesize a perfluoroalkyl group-containing organopolysiloxane intermediate of formula (III): $[(R^1_a R^2_b SiO)_m (RfR^3 SiO)]_n$; and polymerizing the intermediate of formula (III) or a mixture of the intermediate and an organopolysiloxane of formula (IV): $R^5_e R^6_g SiO_{[(4-(e+g)]/2}$ in the presence of a strongly acidic catalyst or strongly basic catalyst.

9 Claims, No Drawings

METHOD FOR PREPARING PERFLUOROALKYL GROUP-CONTAINING ORGANOPOLYSILOXANES

BACKGROUND OF THE INVENTION

The present invention relates to a method for preparing a perfluoroalkyl group-containing organopolysiloxane, and more particularly, to a method for the simple synthesis of an organopolysiloxane containing a perfluoroalkyl group having at least 4 carbon atoms and having a high degree of polymerization.

In the prior art, several methods are well known for preparing perfluoroalkyl group-containing organopolysiloxanes. One known method involves reacting a perfluoroalkyl group-containing alkenyl compound with a hydrogen containing chlorosilane in the presence of a platinum catalyst to synthesize a perfluoroalkyl group-containing chlorosilane, followed by hydrolysis and condensation as disclosed in Japanese Patent Publication Nos. 2694/1959 and 5593/1959. Another method is by co-hydrolysis of a perfluoroalkyl group-containing chlorosilane and a diorganodichlorosilane to form a copolymer of perfluoroalkyl group-containing siloxane and organosiloxane units as disclosed in Japanese Patent Publication Nos. 24743/1970. However, it is difficult to prepare organopolysiloxanes having a high molecular weight using these methods.

A still further method is known from U.S. Pat. No. 3,002,951, wherein a perfluoroalkyl group-containing chlorosilane is hydrolyzed to form a cyclic diorganosiloxane which is then polymerized in the presence of an alkali metal or alkali metal silanolate. However, it is difficult to synthesize organopolysiloxanes containing a perfluoroalkyl group having at least 4 carbon atoms using this method.

For the preparation of polymers having a high molecular weight, U.S. Patent No. 4,317,899 discloses method for polymerizing trifluoropropyl group-containing cyclic siloxane and a compound of the general formula:

$$HO-[-Si(R')(R'')O-]_s-H$$

wherein R' is an alkyl or phenyl group, R'' is $CH_3CH_2CH_2$, group, and letter s is a number having a value of 2 to 50 in the presence of a strong base. This method is limited to the preparation of trifluoropropyl group-containing organo polysiloxanes.

As described above, it was difficult in the prior art to prepare perfluoroalkyl group-containing organopolysiloxanes having a high molecular weight.

SUMMARY OF THE INVENTION

Therefore, an object of the present invention is to provide a novel and improved method capable of readily synthesizing a perfluoroalkyl group-containing organopolysiloxane having a high degree of polymerization and hence, a high molecular weight.

The present inventors have discovered that an organopolysiloxane containing a perfluoroalkyl group having at least 4 carbon atoms and having a high degree of polymerization can be readily synthesized by reacting a liquid organopolysiloxane of the general formula (I):

$$R^1_aR^2_b(OH)_cSiO_{[4-(a+b+c)]/2} \quad (I)$$

wherein $R^1$ and $R^2$, which may be the same or different, are independently selected from monovalent organic groups having 1 to 20 carbon atoms, and letters a, b, and c have values in the ranges of $0 \leq a \leq 2$, $0 \leq b \leq 2$, $0 \leq c \leq 1$, and $1.8 < 1+b+c < 2.2$, with an alkali metal hydroxide to form an alkali metal silanolate, reacting the alkali metal silanolate with a perfluoroalkyl group-containing organosilane of the general formula (II):

$$RfR^3SiX_2 \quad (II)$$

wherein $R^3$ is a monovalent hydrocarbon group having 1 to 20 carbon atoms, Rf is a perfluoroalkyl group-containing organic group of the formula: $C_dF(2d+1)R^4$ wherein $R^4$ is a divalent organic group having 1 to 10 carbon atoms and letter d is an integer within the range of $4 \leq d \leq 16$, and X is a halogen atom, to thereby synthesize a perfluoroalkyl group-containing organopolysiloxane intermediate of the general formula (III):

$$[(R^1_aR^2_bSiO)m(RfR^3SiO)]n \quad (III)$$

wherein $R^1$, $R^2$, $R^3$, Rf, a, and b are as defined above, and letters m and n are independently positive numbers of at least 1, and polymerizing the intermediate of formula (III) or a mixture of the intermediate of formula (III) and an organopolysiloxane of the general formula (IV):

$$R^5_eR^6_gSiO[4-(e+g)]/2 \quad (IV)$$

wherein $R^5$ and $R^6$, which may be the same or different, are independently selected from the class consisting of a hydrogen atom, a hydroxyl group, monovalent hydrocarbon groups having 1 to 20 carbon atoms, and alkoxy groups having 1 to 8 carbon atoms, and letters e and g have values in the ranges of $0 \leq e \leq 3$, $0 \leq g \leq 2$, and $1.8 < e+g \leq 3$, in the presence of a strongly acidic catalyst or strongly basic catalyst.

This method allows synthesis of organopolysiloxanes having a variable proportion of perfluoroalkyl group-containing siloxane units and organopolysiloxane units. It is also possible to control the degree of polymerization of organo-polysiloxanes introducing an end-blocking group. It has been found that a variety of perfluoroalkyl group-containing organopolysiloxanes can be prepared in a simple and efficient manner.

The present invention thus provides a method for preparing a perfluoroalkyl group-containing organopoly-siloxane, comprising the steps of:

reacting a liquid organopolysiloxane of formula (I) and an alkali metal hydroxide to form an alkali metal silanolate, reacting the alkali metal silanolate with a perfluoro alkyl group-containing organosilane of formula (II) to thereby synthesize a perfluoroalkyl group-containing organo-polysiloxane termediate of formula (III), and polymerizing the intermediate of formula (III) or a mixture of the intermediate of formula (III) and an organopolysiloxane of formula (IV) in the presence of a strongly acidic catalyst or strongly basic catalyst, formulae (I) through (IV) being as defined above.

DETAILED DESCRIPTION OF THE INVENTION

In preparing a perfluoroalkyl group-containing organopolysiloxane according to the present invention, the first step comprises reacting a liquid organopolysiloxane of formula (I) and an alkali metal hydroxide to form an alkali metal silanolate.

One of the starting reactants, liquid organopoly-siloxane of formula (I):

$$R^1_a R^2_b (OH)_c SiO_{[4-(a+b+c)]/2} \quad (I)$$

wherein $R^1$ and $R_2$, which may be the same or different, are independently selected from monovalent organic groups, and letters a, b, and c have values in the ranges of $0 \leq a \leq 2$, $0 \leq b \leq 2$, $0 \leq c \leq 1$, and $1.8 < a+b+c < 2.2$ as defined above. Preferably, substitutes $R^1$ and $R^2$ are selected from monovalent hydrocarbon groups having 1 to 20 carbon atoms, especially 1 to 8 carbon atoms, for example, lower alkyl groups such as methyl, ethyl, propyl, and butyl groups, alkenyl groups such as vinyl and alkyl groups, aryl groups such as phenyl and tollyl groups, and phenylethyl and analogous groups. The liquid organopolysiloxanes of formula (I) may either be in a cyclic or chain form. Examples of the liquid organopolysiloxane of formula (I) include hexamethylcyclotrisiloxane, octamethylcyclotetrasiloxane, decamethylcyclopentasiloxane, dodecamethylcyclohexasiloxane, 1,3,5-trimethyl 1, 3,5-triphenylcyclotrisiloxane, 1,3,5,7-tetramethyl-1,3,5,7-tetraphenylcyclotetrasiloxane, 1,3,5,7-tetra-methyl-1,3,5,7-tetravinylcyclotetrasiloxane, 1,1,3,3 tetra-methyl-1,3-disiloxane diol, 1,1,3,3,5,5-hexamethyl-1,5-tri-siloxane diol, 1,1,3,3,5,5,7,7-octamethyl-1,7-tetrasiloxane diol, 1,1,3,3,5,5-hexaphenyl-1,5-trisiloxane diol, and α, ω-dihydroxydimethylpolysiloxane.

The alkali metal hydroxide may preferably selected from those known as a polymerization catalyst for organopoly. siloxanes, for example, KOH, NaOH, CsOH, and LiOH. The amount of alkali metal hydroxide used is not particularly limited although it is preferably used in an amount of 0.1 to 2 mol per mcl of the silicon atom of the organopoly-siloxane of formula (I).

An alkali metal silanolate may be synthesized from the above-defined reactants by previously dissolving and diluting the alkali metal hydroxide in water, lower alcohol or a mixture thereof in an amount of 0.5 to 10 times the amount of the alkali metal hydroxide, mixing the solution with a liquid organopolysiloxane of formula (I), and maintaining the mixture at about 50° to 120° C. for about 1 to 10 hours for reaction. At the end of the reaction, a hydro-carbon solvent such as benzene, toluene, xylene, n-hexane, cyclohexane, and n-heptane is added, preferably in an amount of 2 to 5 times the weight of the silicone compound or alkali metal silanolate, to the reaction product, from which the water and alcohol are removed by azeotropic distilla tion, yielding an organopolysiloxane oligomer blocked with alkali metal silanolate at both ends having a degree of polymerization of 1 to 5, preferably 1 to 3.

The second step is to react the resulting alkali metal silanolate with a perfluoroalkyl group-containing organosilane of formula (II).

The perfluoroalkyl group-containing organosilane used herein is of formula (II):

$$R_f R^3 SiX_2 \quad (II)$$

In formula (II), $R^3$ is a mcnovalent hydrocarbon group having 1 to 20 carbon atoms. The substituent $R^3$ is preferably selected from monovalent hydrocarbon groups, for example, lower alkyl groups such as methyl, ethyl, propyl, and butyl groups, alkenyl groups such as vinyl and allyl groups, aryl groups such as phenyl and tollyl groups, and phenylethyl and analogous groups. X is a halogen atom such as fluorine, chlorine, iodine and bromine. The substituent Rf is a perfluoroalkyl group-containing organic group of the formula: $C_d F_{(2d+1)} R^4$ wherein $R^4$ is a divalent organic group and letter d is an integer within the range of $4 \leq d \leq 16$. The organic group represented by $R^4$ may be an alkylene group, a phenylene group or an organic hetero group containing a sulfur or oxygen atom and preferably have 1 to 10 carbon atoms, especially 2 to 6 carbon atoms. Examples of the perfluoroalkyl group-containing organosilane of formula (II) used herein include $C_4F_9CH_2CH_2(CH_3)SiCl_2$,
$Clhd 6F_{13}CH_2CH_2(CH_3)SiCl_2$,
$C_8F_{17}CH_2CH_2(CH_3)SiCl_2$,
$C_{12}F_{25}CH_2CH_2(CH_3)SiCl_2$,
$C_4F_9CH_2CH_2C_6H_4(CH_3)SiCl_2$,
$C_6F_{13}CH_2CH_2(C_6H_5)SiCl_2$,
$C_8F_{17}CH_2CH_2(C_2H_5)SiBr_2$,
$C_8F_{17}(CH_2)_3(C_2H_5)SiCl_2$,
$C_4F_9CH_2CH_2SCH_2CH_2(CH_3)SiCl_2$,
$C_6F_{13}CH_2CH_2SCH_2CH_2(CH_3)SiCl_2$,
$C_8F_{17}CH_2CH_2SCH_2CH_2(CH_3)SiCl_2$,
$C_{10}F_{21}CH_2CH_2SCH_2CH_2(CH_3)SiCl_2$, and
$C_4F_9SCH_2CH_2(CH_3)SiCl_2$.

The amount of the compound of formula (II) used is not particularly limited although it is preferably used in an amount of 0.1 to 1.2 mol per mol of the alkali metal silanolate.

In the practice of the second step, the perfluoroalkyl group-containing organosilane of formula (II) is added dropwise to the alkali metal silanolate in a hydrocarbon solvent, for example, benzene, toluene, xylene, n-hexane, cyclohexane, and n-heptane. The mixture is subject to reaction for about 2 to 30 hours under reflux at the boiling temperature of the solvent. Then reaction takes place according to the scheme:

$$\equiv Si\text{-}O\text{-}M + X\text{-}Si\equiv \rightarrow \equiv Si\text{-}OSi\equiv + MX$$

wherein X is a halogen atom and M is an alkali metal, replacing the terminal alkali metal silanolate by a siloxane bond. There is obtained a perfluoroalkyl group-containing organopolysiloxane intermediate of the general formula (III):

$$[(R^1_a R^1_b SiO)_m (R_f R^3 SiO)]_n \quad (III)$$

wherein $R^1$, $R^2$, $R^3$, Rf, a, and b are as defined above, and letters m and n are independently positive numbers of at least 1, usually 1 to 50, especially 1 to 30.

The hydrocarbon solvents used herein may be selected from the group consisting of benzene, toluene, xylene, n-heptane, n-hexane, cyclohexane, methylene chloride, 1,1,1-trichloroethane, ethyl acetate, and butyl acetate.

The third step of the present method is to homo. polymerize the intermediate of formula (III) or to copolymerize a mixture of the intermediate of formula (III) and an organopolysiloxane of formula (IV), thereby synthesizing the end product, perfluoroalkyl group containing organopolysiloxane having a high degree of polymerization.

The second component which may be copolymerized with the intermediate of formula (III) is an organopolysiloxane of the general formula (IV):

wherein $R^5$ and $R^{6,}$ which may be the same or different, are independently selected from the class consisting of a hydrogen atom, a hydroxyl group, a monovalent hydrocarbon group, and an alkoxy group, and letters e and g have values in the ranges of $0 \leq e \leq 3$, $0 \leq g \leq 2$, and $1.8 \leq 3 + g \leq 3$ as defined above. The substitutes $R^5$ and $R^6$ may preferably be selected from hydrogen, a hydroxyl group, and monovalent hydrocarbon groups having 1 to 20 carbon atoms, especially 1 to 8 carbon atoms, for example, lower alkyl groups such as methyl, ethyl, propyl, and butyl groups, alkenyl groups such as vinyl and allyl groups, aryl groups such as phenyl and tollyl groups, and a phenylethyl group, and alkoxy groups having 1 to 8 carbon atoms such as methoxy, ethoxy, and propoxy groups. The organopolysiloxanes of formula (IV) may be either in cyclic or chain form. Examples of the organo-polysiloxane of formula (IV) include hexamethylcyclotri siloxane, tetramethylcyclotetrasiloxane, octamethylcyclo-tetrasiloxane, decamethylcyclopentasiloxane, dodecamethyl-cyclohexasiloxane, 1,3,5-trimethyl-1,3,5-triphenylcyclotri-siloxane, 1,3,5,7-tetramethyl-1,3,5,7-tetraphenyl-cyclotetra-siloxane, 1,1,3,3,5,5-hexamethyltrisiloxane-1,5-diol, and 1,1,3,3,5,5,7,7-octamethyltetrasiloxane-1,7-diol.

The amount of the compound of formula (IV) used is not particularly limited although it is preferably used in an amount of 0 to 10 mol per mcl of the perfluoroalkyl group-containing organopolysiloxane intermediate.

Homo-polymerization of a perfluoroalkyl group-containing organopolysiloxane intermediate of formula (III) Q or copolymerization of a mixture of the intermediate of formula (III) and an organopolysiloxane of formula (IV) may be carried out in the presence or absence of a compound having an end-blocking group using a strongly acidic catalyst or strongly basic catalyst.

The compound having an end-blocking group is used as an end blocking agent for controlling the degree of polymerization of the resulting organopolysiloxane. The end-blocking compound may be of the general formula (V):

wherein R7 and R8 are as defined for $R^5$ and $R^{6,}$ and letters h and i are as defined for e and g, with the sum of h+i being equal to 3. For example, hexamethyldisiloxane, tetra-methyldisiloxane, octamethyltrisiloxane, 1,2-dihydroxy-tetramethyldisilo 1,2-dichlorotetramethyldisiloxane, 1,2-divinyltetramethyldisiloxane, and 1,2-diphenyltetra methyldisiloxane may preferably be used. The end blocking agent may be used in an amount of 0 to 1/25 mol per mol of said intermediate.

A strongly acidic catalyst is used to promote the polymerization. A strongly acidic substance such as sulfuric acid, nitric acid, sulfuric anhydride, trifluoromethanesulfonic acid, and trifluoroacetic acid, especially trifluoromethanesulfonic acid is used in an amount of 0.01 to 10% by weight based on the total weight of siloxane, that is, the weight of the intermediate or the total weight of the intermediate and compound of formula (IV). Reaction may be continued for about 5 to 30 hours at about 20 to 120° C. At the end of reaction, the reaction product is desirably washed with water or neutralized with alkali carbonates such as sodium carbonate and sodium hydrogen carbonate under anhydrous conditions.

Alternatively, a strongly basic catalyst is used to promote the polymerization. Examples of the strongly basic substance used include those basic substances well known for polymerization of organopolysiloxanes, for example, alkali metal hydroxides such as CsOH, NaOH and KOH, tetrabutyl-phosphonium hydroxide, tetramethylammonium hydroxide and similar compounds, and silanolates of these compounds with organopolysiloxanes. It may be added to the reaction system in an amount of 0.1 to 0.00001 mol per mol of the Si atom in the entire organopolysiloxanes to be polymerized, especially in an amount of 0.01 to 0.0001 mcl on the same basis in the case of alkali metal hydroxides. Reaction may be continued with stirring for about 3 to 6 hours at about 120 to 160° C. At the end of reaction, the reaction product is desirably neutralized with neutralizing agents for alkali catalysts, for example, acidic substances such as acetic acid and hydrochloric acid, chlorosilanes such as trimethylchloro-silane, and ethylene chlorohydrin.

The perfluoroalkyl group-containing organopolysiloxanes prepared by the present method can be widely utilized as stock materials for a variety of silicone products. For example, they may be used as defoaming agents, mold release agents, fiber treating agents, water repellents, oil repellents, lubricants, dielectric fluid, lubricating or working fluids for precision machines and electric parts, paint additives, resin modifiers, and cosmetics fluid.

According to the method of the present invention, organopolysiloxanes containing a perfluoroalkyl group having at least 4 carbon atoms can be readily produced in high yields. It is possible to synthesize organopolysiloxanes having a variable proportion of perfluoroalkyl group-containing siloxane units and organopolysiloxane units. It is also possible to control the degree of polymerization of the organopolysiloxanes by introducing an end blocking group. The end organopolysiloxanes generally have a degree of polymerization of from 3 to 10,000, preferably from 20 to 1,000.

EXAMPLE

Examples of the invention are given below by way of illustration and not by way of limitation. All percents are by weight unless otherwise stated.

EXAMPLES 1-2

SYNTHESIS OF INTERMEDIATES

A three-necked flask was charged with 320 grams of 50% sodium hydroxide in water (4.0 mol of NaOH), 148 grams (0.5 mol) of octamethylcyclotetrasiloxane, and 140 grams of methanol. After the flask was heated to 95° C., the contents were stirred for 2 hours until a homogeneous mixture was obtained. Then 1,000 grams of toluene was added to the flask. After azeotroping off the water and methanol, 722 grams (2.0 mol) of nonafluorohexylmethyldichlorosilane was added dropwise. The resulting white precipitate was filtered off and the filtrate was stripped of the solvent, obtaining a clear colorless oily fluid. It was found to be a perfluoroalkyl group-containing organopolysiloxane intermediate (Intermediate 1) consisting of 50 mol % of nonafluorohexylmethylsiloxane units and 50 mol % of dimethylsiloxane units and have physical properties as reported in Table 1.

The same procedure as described for Intermediate 1 was repeated except that the 148 grams (0.5 mcl) of octamethyl-cyclotetrasiloxane was replaced by 222 grams (0.75 mol), grams (1.0 mcl), and 370 grams (1.25 mol) of octamethyl cyclotetrasiloxane, obtaining three clear colorless oily fluids. They were perfluoroalkyl group-containing organopolysiloxane intermediates (Intermediates 2, 3, and 4), in which the molar ratio of dimethylsiloxane units to nonafluorohexylmethylsiloxane units was 1.5:1.0 for Intermediate 2, 2.0:1.0 for Intermediate 3, and 2.5:1.0 for Intermediate 4. Their physical properties are also reported in Table 1.

TABLE 1

| Inter-mediate | Component unit molar ratio* | Viscosity @ 25° C. (cs) | Specific gravity @ 25° C. | Refractive index @ 25° C. |
|---|---|---|---|---|
| 1 | 1.0 | 41.2 | 1.364 | 1.3571 |
| 2 | 1.5 | 35.1 | 1.314 | 1.3610 |
| 3 | 2.0 | 36.0 | 1.278 | 1.3645 |
| 4 | 2.5 | 29.4 | 1.246 | 1.3675 |

*Molar ratio of dimethylsiloxane units to nonafluorohexylmethylsiloxane units:

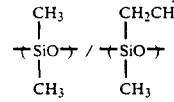

Next, perfluoroalkyl group-containing organopoly. siloxanes were prepared as follows using Intermediates 1 to 4 synthesized above.

SYNTHESIS OF PERFLUOROALKYL GROUP-CONTAINING ORGANOPOLY-SILOXANES

A three-necked flask was charged with each of Intermediates 1 to 4 in the amount shown in Table 2 and 1.62 grams (0.01 mol) of hexamethyldisiloxane end-blocking agent. Trifluoromethanesulfonic acid catalyst was added to the flask in an amount of 0.05% by weight based on the total weight of siloxane. The flask was maintained for 4 hours at room temperature for reaction. Sodium carbonate in an amount 20 times the weight of the catalyst was added for neutralization, and filtered off. The reaction mixture was stripped of the unreacted monomer at 140° C. and 15 mmHg for 2 hours, obtaining a clear colorless oily fluid in each run. All the products were perfluoroalkyl group-containing organopolysiloxanes (Examples 1 to 12) having general formula (1):

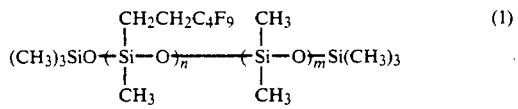

wherein n and m are shown in Table 2. Their physical properties are shown in Table 2.

TABLE 2

| | Intermediate | | | | Physical properties | | |
| Example | Type | Amount (g) | m* mol | n* mol | Viscosity @ 25° C. (cs) | Specific gravity @ 25° C. | Refractive index @ 25° C. |
|---|---|---|---|---|---|---|---|
| 1 | 1 | 190 | 50 | 50 | 271.1 | 1.358 | 1.3585 |
| 2 | 1 | 380 | 100 | 100 | 485.1 | 1.363 | 1.3582 |
| 3 | 1 | 760 | 200 | 200 | 1288.5 | 1.366 | 1.3579 |
| 4 | 2 | 166.8 | 60 | 40 | 238.7 | 1.307 | 1.3625 |
| 5 | 2 | 333.6 | 120 | 80 | 434.4 | 1.314 | 1.3622 |
| 6 | 2 | 667.2 | 240 | 160 | 1195.7 | 1.317 | 1.3620 |
| 7 | 3 | 151.3 | 67 | 33 | 214.7 | 1.278 | 1.3660 |
| 8 | 3 | 302.7 | 133 | 67 | 402.1 | 1.276 | 1.3658 |
| 9 | 3 | 605.3 | 267 | 133 | 1106.2 | 1.279 | 1.3655 |
| 10 | 4 | 151.3 | 71 | 29 | 180.1 | 1.241 | 1.3695 |
| 11 | 4 | 302.7 | 143 | 57 | 358.6 | 1.246 | 1.3690 |
| 12 | 4 | 605.3 | 286 | 114 | 1013.5 | 1.250 | 1.3685 |

*The letters correspond to those in formula (1), m is the moles of dimethylsiloxane unit, and n is the moles of nonafluorohexylmethylsiloxane unit.

EXAMPLE 13

SYNETHESIS OF INTERMEDIATE

The same procedure as described for Intermediate 1 in Example 1 was repeated except that 296 grams (1.0 mol) of octamethylcyclotetrasiloxane was used and the nonafluoro hexylmethyldichlorosilane was replaced by 1122 grams (2.0 mol) of heptadecafluorodecylmethyldichlorosilane. There was obtained a perfluoroalkyl group-containing organopoly. siloxane intermediate (Intermediate 5), in which the molar ratio of dimethylsiloxane units to heptadecafluorodecyl-methylsiloxane units was 2.0:1.0. Its physical properties are reported in Table 3.

TABLE 3

| Inter-mediate | Component unit molar ratio* | Viscosity @ 25° C. (cs) | Specific gravity @ 25° C. | Refractive index @ 25° C. |
|---|---|---|---|---|
| 5 | 2.0 | 911.9 | 1.352 | 1.3541 |

*Molar ratio of dimethylsiloxane units to heptadecafluorodecylmethylsiloxane units:

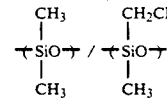

SYNTHESIS OF PERFLUOROALKYL GROUP-CONTAINING ORGANOPOLY-SILOXANE

A three-necked flask was charged with 215.3 grams of Intermediate 5 and 1.62 grams (0.01 mol) of hexamethyl-disiloxane end-blocking agent. Trifluoromethanesulfonic acid catalyst was added to the flask in an amount of 0.05% by weight based on the total weight of siloxane. The flask was maintained for 4 hours at room temperature for reaction. Sodium carbonate in an amount 20 times the weight of the catalyst was added for neutralization, and filtered off. The reaction mixture was stripped of the unreacted monomer at 140° C. and 15 mmHg for 2 hours, obtaining a clear colorless oily fluid. The product was a perfluoroalkyl group-containing organopolysiloxane having general formula (2):

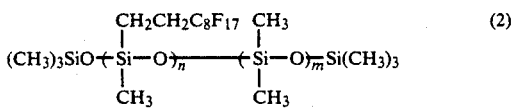

wherein n and m are shown in Table 4. Its physical properties are shown in Table 4.

EXAMPLES 14-17

The later procedure of Example 13 was repeated except that the flask was first charged with Intermediate 5, octamethylcyclotetrasiloxane, and hexamethyldisiloxane end-blocking agent in the respective amounts shown in Table 4. There were obtained perfluoroalkyl group-containing organopolysiloxanes whose composition and physical properties are also shown in Table 4.

TABLE 4

| Example | Blending amount (g) | | | | | Physical properties | | |
| --- | --- | --- | --- | --- | --- | --- | --- | --- |
| | Intermediate 5 | Octamethyl-cyclotetra-siloxane | Hexamethyl-disiloxane | m* | n* | Viscosity @ 25° C. (cs) | Specific gravity @ 25° C. | Refractive index @ 25° C. |
| 13 | 215.3 | — | 1.26 | 67.3 | 32.7 | 2531.0 | 1.352 | 1.3540 |
| 14 | 141.3 | 26.0 | 1.6 | 78.4 | 21.6 | 1554.6 | 1.295 | 1.3656 |
| 15 | 78.5 | 47.4 | 1.6 | 88.0 | 12.0 | 675.0 | 1.230 | 1.3746 |
| 16 | 41.9 | 59.8 | 1.6 | 93.6 | 6.4 | 278.1 | 1.127 | 1.3840 |
| 17 | 17.0 | 68.2 | 1.6 | 97.4 | 2.6 | 150.7 | 1.042 | 1.3939 |

*The letters correspond to those in formula (2), m is the moles of dimethylsiloxane unit, and n is the moles of heptadecafluorodecylmethylsiloxane unit.

TABLE 5

| | Physical properties | | |
| --- | --- | --- | --- |
| | Viscosity @ 25° C. (cs) | Specific gravity @ 25° C. | Refractive index @ 25° C. |
| Intermediate 6 | 86.2 | 1.280 | 1.3741 |
| Compound of formula (3) | 368.2 | 1.276 | 1.3690 |

EXAMPLE 19

A three-necked flask was charged with 190 grams of Intermediate 1 and 1.62 grams (0.01 mcl) of hexamethyl-disiloxane end-blocking agent. Potassium hydroxide catalyst was added to the flask in an amount of 0.1% by weight based on the total weight of siloxane. The flask was maintained for 8 hours at 140° C. for reaction. Thereafter ethylene chlorohydrin in an amount 10 times the weight of the catalyst was added to the reaction mixture, which was heated at 80° C. for one hour for neutralization. After filtration, the reaction mixture was stripped of the unreacted monomer at 140° C. and 15 mmHg for 2 hours, obtaining a clear colorless oily fluid. The product was a perfluoroalkyl group-containing organopolysiloxane similar to that of Example 1. It was measured for physical properties, finding a viscosity of 254.0 centistokes at 25° C., a specific gravity of 1.355 at 25° C., and a refractive index of 1.3587 at 25° C.

Several preferred embodiments have been described. Obviously many modifications and variations of the present invention are possible in the light of the above teachings. It is therefore to be understood that within the scope of the appended claims, the invention may be practiced otherwise than as specifically described.

We claim:

1. A method for preparing a perfluoroalkyl group-containing organopolysiloxane, comprising the steps of:
reacting a liquid organopolysiloxane of the general formula (I):

$$R^1_a R^2_b (OH)_c SiO_{[4-(a+b+c)]/2} \quad (I)$$

wherein $R^1$ and $R^2$, which may be the same or different, are independently selected from monovalent organic groups having 1 to 20 carbon atoms, and letters, a, b, and c have values in the ranges of $0 \leq a \leq 2$, $0 \leq b \leq 2$, $0 \leq c \leq 1$, and $1.8 \leq a+b+c \leq 2.2$, with an alkali metal hydroxide to form an alkali metal silanolate, reacting the alkali metal silanolate with a perfluoroalkyl group-containing organosilane of the general formula (II):

$$R_f R^3 SiX_2 \quad (II)$$

EXAMPLE 18

SYNTHESIS OF INTERMEDIATE

The same procedure as described for Intermediate 5 in Example 13 was repeated except that the heptadecafluoro decylmethyldichlorosilane was replaced by 786 grams (2.0 mol) of nonafluorohexylthioethylmethyldichlorosilane. There was obtained a perfluoroalkyl group-containing organopoly-siloxane intermediate (Intermediate 6), in which the molar ratio of dimethylsiloxane units to nonafluorohexylthioethyl-methylsiloxane units was 2.0:1.0. Its physical properties are shown in Table 5.

The later procedure of Example 13 was repeated except that the flask was first charged with 514 grams of Intermediate 6 and 6.48 grams (0.04 mcl) of hexamethyl-disiloxane end-blocking agent. There was obtained a pale yellow clear oily fluid, which was found to be a perfluoro-alkyl group-containing organopolysiloxane having general formula (3):

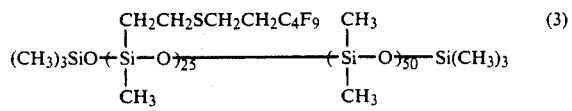

Its physical properties are shown in Table 5.

wherein R³ is a monovalent hydrocarbon group having 1 to 20 carbon atoms, Rf is a perfluoroalkyl group-containing organic group of the formula: $C_dF_{(2d+1)}R^4$ wherein $R^4$ is a divalent organic group having 1 to 10 carbon atoms and letter d is an integer within the range of $4 \leq d \leq 16$, and X is a halogen atom in a hydrocarbon solvent for about 2 to 30 hours under reflux at the boiling temperature of the solvent, to thereby synthesize a perfluoroalkyl group-containing organopolysiloxane intermediate of the general formula (III):

$$[(R^1_aR^2_bSiO)_m(RfR^3SiO)]_n \qquad (III)$$

wherein $R^1$, $R^2$, $R^3$, Rf, a, and b are as defined above, and letters m and n are independently positive numbers of at least 1, and polymerizing the intermediate of formula (III) in the presence of a strongly acidic catalyst for about 5 to 30 hours at a reaction temperature of about 20° to 120° C. or strongly basic a reaction temperature for about 3 to 6 at a reaction temperature of about 120° to 160° C. to thereby form the perfluoroalkyl group-containing organopolysiloxane.

2. The method of claim 1 wherein the step of polymerizing the intermediate of formula (III) includes polymerizing a mixture of the intermediate of formula (III) and an organopolysiloxane of the general formula (IV):

$$R^5_eR^6_gSiO_{[(4-(e+g)]/2} \qquad (IV)$$

wherein $R^5$ and $R^6$, which may be the same or different, are independently selected from the class consisting of hydrogen, a hydroxyl group, monovalent hydrocarbon groups having 1 to 20 carbon atoms, and alkoxy groups having 1 to b 8 carbon atoms, and letters e and g have values in the ranges of $\leq e \leq 3$, $0 \leq g \leq 2$, and $1.8 \leq e+g \leq 3$.

3. The method of claim 1 or 2 wherein the alkali metal hydroxide is used in an amount of 0.1 to 2 mol per mol of the silicon atom of the organopolysiloxane of formula (I).

4. The method of claim 1 or 2 wherein the step of reacting the organopolysiloxane of formula (I) with the alkali metal hydroxide is carried out at about 50° to about 120° C. for about 1 to about 10 hours.

5. The method of claim 1 or 2 wherein the organosilane of formula (II) is used in an amount of 0.1 to 1.2 mol per mol of the alkali metal silanolate.

6. The method of claim 1 or 2 wherein the step of reacting the alkali metal silanolate with the organosilane of formula (II) is carried out for about 2 to about 30 hours under reflux.

7. The method of claim 1 or 2 wherein the polymerizing step employs the strongly acidic catalyst in an amount of 0.01 to 10% by weight based on the total weight of siloxanes.

8. The amount of claim 1 or 2 wherein the polymerizing step employs the strongly basic catalyst in an amount of 0.1 to 0.00001 mol per mol of the silicon atom in the entire organopolysiloxanes to be polymerized.

9. The method of claim 1 or 2 wherein the polymerizing step includes adding an end-blocking agent of the formula:

$$R^7_hR^8_iSiO_{1/2} \qquad (V)$$

wherein $R^7$ and $R^8$ are independently selected from the class consisting of hydrogen, a hydroxyl group, mcnovalent hydrocarbon groups having 1 to 20 carbon atoms, and alkoxy groups having 1 to 8 carbon atoms, and letters h and i have values in the ranges of $0 < h \leq 3$, $0 \leq i \leq 2$, and $h+i=3$, in an amount of 0 to 1/25 mol per mol of the intermediate.

* * * * *